(12) United States Patent
Kaneko et al.

(10) Patent No.: US 10,333,153 B2
(45) Date of Patent: *Jun. 25, 2019

(54) FUEL CELL CATALYST LAYER, AND FUEL CELL

(71) Applicant: TOYOTA JIDOSHA KABUSHIKI KAISHA, Toyota-shi, Aichi-ken (JP)

(72) Inventors: Keiichi Kaneko, Toyota (JP); Toru Morita, Toyota (JP); Junji Nakanishi, Toyota (JP); Hiroo Yoshikawa, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 2 days.

This patent is subject to a terminal disclaimer.

(21) Appl. No.: 15/287,831

(22) Filed: Oct. 7, 2016

(65) Prior Publication Data

US 2017/0104223 A1 Apr. 13, 2017

(30) Foreign Application Priority Data

Oct. 9, 2015 (JP) ................................ 2015-201345

(51) Int. Cl.
*H01M 4/92* (2006.01)
*H01M 4/86* (2006.01)
*H01M 8/1018* (2016.01)

(52) U.S. Cl.
CPC ......... *H01M 4/926* (2013.01); *H01M 4/8605* (2013.01); *H01M 4/8668* (2013.01); *H01M 8/1018* (2013.01); *H01M 2008/1095* (2013.01)

(58) Field of Classification Search
CPC .................................................. H01M 4/926
See application file for complete search history.

(56) References Cited

U.S. PATENT DOCUMENTS

| | | | |
|---|---|---|---|
| 2003/0013606 A1 | 1/2003 | Hampden-Smith et al. | |
| 2006/0280983 A1 | 12/2006 | Kaneko et al. | |
| 2008/0063917 A1* | 3/2008 | Yamashita | C08J 5/2256 429/483 |
| 2010/0152031 A1* | 6/2010 | Borchtchoukova | H01M 4/8673 502/185 |
| 2011/0053039 A1 | 3/2011 | Pak et al. | |
| 2011/0200917 A1 | 8/2011 | Takahashi et al. | |
| 2014/0154608 A1* | 6/2014 | Nonoyama | H01M 4/8663 429/482 |
| 2014/0287344 A1 | 9/2014 | Suzue et al. | |
| 2015/0295250 A1 | 10/2015 | Nagami et al. | |
| 2016/0072133 A1 | 3/2016 | Akizuki et al. | |
| 2016/0079605 A1 | 3/2016 | Mashio et al. | |
| 2016/0233520 A1* | 8/2016 | Takahashi | B01J 21/18 |
| 2017/0104222 A1 | 4/2017 | Ikehata et al. | |

FOREIGN PATENT DOCUMENTS

| | | | |
|---|---|---|---|
| JP | 2002-260705 | 9/2002 | |
| JP | 2006-344578 A | 12/2006 | |
| JP | 2009-110768 A | 5/2009 | |
| JP | 2010-102889 A | 5/2010 | |
| JP | 2013-51051 | 3/2013 | |
| JP | 2013-109856 | 6/2013 | |
| JP | 2013-134877 | 7/2013 | |
| JP | 2014-56791 | 3/2014 | |
| JP | 2014-216157 | 11/2014 | |
| JP | WO 2015045852 A1 * | 4/2015 | B01J 21/18 |
| WO | WO 2014/175099 A1 | 10/2014 | |
| WO | WO 2014/175100 A1 | 10/2014 | |
| WO | WO 2014/175101 A1 | 10/2014 | |
| WO | WO 2014/175105 A1 | 10/2014 | |

OTHER PUBLICATIONS

Ho-Young Jung et al., "Role of the Glass Transition Temperature of Nafion 117 Membrane in the Preparation of the Membrane Electrode Assembly in a Direct Methanol Fuel Cell (DMFC)," International Journal of Hydrogen Energy, 37 (2012), pp. 12580-12585.

Office Action issued in U.S. Appl. No. 15/287,794 dated Dec. 15, 2017.

Advisory Action issued in U.S. Appl. No. 15/287,794 dated Jul. 30, 2018.

Office Action issued in U.S. Appl. No. 15/287,794 dated Jan. 28, 2019.

\* cited by examiner

*Primary Examiner* — Philip A. Stuckey
(74) *Attorney, Agent, or Firm* — Finnegan, Henderson, Farabow, Garrett & Dunner, LLP

(57) ABSTRACT

The fuel cell catalyst layer has: a catalyst including a carbon support having pores with a pore diameter of from 1 nm to 5 nm and a catalyst metal supported within the pores of the carbon support; and an ionomer having a glass transition temperature equal to or greater than 160° C.

3 Claims, No Drawings

US 10,333,153 B2

FUEL CELL CATALYST LAYER, AND FUEL CELL

CROSS-REFERENCES TO RELATED APPLICATIONS

This application relates to and claims priority from Japanese Patent Application No. 2015-201345, filed on Oct. 9, 2015, the entire disclosure of which is incorporated herein by reference.

BACKGROUND

Field

The present invention relates to a catalyst layer included in a fuel cell, and a fuel cell including such catalyst layer.

Description of Related Art

A fuel cell has a structure in which an electrolyte material is placed between a pair of electrodes. For example, a fuel cell, known as a polymer electrolyte fuel cell, has a membrane electrode assembly (hereinafter, simply referred to as an "MEA") as its basic structure, in which an electrolyte membrane having proton conductivity is placed between a pair of electrodes. A membrane electrode assembly typically has a structure including at least one pair of catalyst layers and an electrolyte membrane placed between the pair of catalyst layers. As one example of such catalyst layer, a fuel cell catalyst layer including a catalyst and an electrolyte is disclosed, the catalyst being comprised of a catalyst support and a catalyst metal supported in the catalyst support (see, for example, WO2014/175100).

SUMMARY

WO2014/175100 discloses specific catalysts by defining the mode radius in the distribution of pores in the catalyst support, the volume of pores, and the like. According to WO2014/175100, high catalytic activity can be obtained since the catalyst metal is supported within the pores of the catalyst support. By using a catalyst layer prepared by combining a catalyst as described in WO2014/175100 with an electrolyte as described in the same document, catalytic activity can be expected to be considerably increased as compared to a catalyst layer using a conventional catalyst support having no pores. However, when a catalyst layer is formed by using the catalyst disclosed in WO2014/175100 together with an ordinary electrolyte typically used for polymer electrolyte fuel cells, the catalytic activity is not sufficiently increased and there is still room for improvement.

An object of the present invention is to provide a fuel cell catalyst layer having excellent catalytic activity, and a fuel cell having such catalyst layer.

The above object of the present invention can be achieved by way of the following means:

(1) A fuel cell catalyst layer including: a catalyst including a carbon support having pores with a pore diameter of from 1 nm to 5 nm and a catalyst metal supported within the pores of the carbon support; and an ionomer having a glass transition temperature equal to or greater than 160° C.;

(2) A fuel cell catalyst layer as defined in item (1) above, wherein the ionomer has an oxygen permeability equal to or greater than $2.0 \times 10^{-14}$ mol/m/sec/Pa in an environment at a temperature of 80° C. and a relative humidity of 30%; and (3) The fuel cell catalyst layer as defined in item (1) above, wherein the pore volume of the pores with a pore diameter of from 1 nm to 5 nm is greater than 15.0 mL/g.

(4) The fuel cell catalyst layer as defined in item (1) above, wherein the carbon support further including pores with a pore diameter greater than 5 nm and 10 nm or less.

(5) The fuel cell catalyst layer as defined in item (4), wherein the pore volume of pores with a pore diameter greater than 5 nm and 10 nm or less is from 1 mL/g to 10 mL/g (6) A fuel cell including a fuel cell catalyst layer as defined in item (1) above.

A fuel cell catalyst layer having excellent catalytic activity, and a fuel cell having such catalyst layer, can be provided based on the present invention.

DETAILED DESCRIPTION

Hereinafter, a fuel cell catalyst layer according to an embodiment of the present invention and a fuel cell including such catalyst layer will be described.

Fuel Cell Catalyst Layer

A fuel cell catalyst layer according to the present embodiment (hereinafter simply referred to as the "catalyst layer of the present embodiment") has: a catalyst including a carbon support having pores with a pore diameter of from 1 nm to 5 nm and a catalyst metal supported within the pores of the carbon support; and an ionomer having a glass transition temperature equal to or greater than 160° C. The catalyst layer of the present embodiment is configured such that the carbon support (catalyst) supporting a catalyst metal within the pores thereof is covered by the ionomer. Here, such ionomer also functions as an adhesive for binding several catalysts therebetween.

According to the fuel cell catalyst layer of the present embodiment, a carbon support having pores with a pore diameter of from 1 nm to 5 nm is combined with an ionomer having a glass transition temperature equal to or greater than 160° C., and such combination can provide an increased catalytic activity of the resulting catalyst layer. The mechanism/action of achieving an increase of the catalytic activity in the catalyst layer of the present embodiment can be inferred as follows, although the mechanism/action is not particularly limited to that described below.

Ionomers, in general, easily adhere to platinum (Pt) or other catalyst metals. An ionomer adhered to the surface of a catalyst metal may be responsible for the degradation (poisoning) of the catalyst metal. When a catalyst in which a catalyst metal is supported within the pores of a carbon support is used, contact between the catalyst metal surface and the ionomer can be effectively reduced, as compared to the case of using a catalyst in which a catalyst metal is supported only on the surface of the carbon support. Such reduction of the amount of ionomer adhering onto the surface of the catalyst metal in the catalyst layer due to the use of a carbon support having pores therein is expected to bring about the effect of increasing the catalytic activity of the catalyst layer. In particular, in the case of a catalyst using a carbon support having pores almost categorized as mesopores (i.e. pores with a diameter of from around 2 nm to around 50 nm (1 nm to 25 nm radius)), a further improvement of the catalytic activity can be expected.

Meanwhile, typical ionomers used for a catalyst layer of a polymer electrolyte fuel cell often have a glass transition temperature of from around 110° C. to around 140° C. However, as already stated above, when a catalyst using a carbon support having mesopores is used in combination with such typical ionomers, the resulting catalyst layer may not be able to achieve a sufficient effect of increasing its catalytic activity. The reason therefor is not certain; however, according to the study by the present inventors, typical ionomers, having low viscosity and high flexibility, may enter the pores of the carbon support even if the pores have sizes almost categorized as mesopores.

Accordingly, it can be inferred that a catalyst layer using a typical ionomer cannot sufficiently reduce the amount of ionomer adhered onto the surface of the catalyst metal supported within the pores of the carbon support, even in the case where the catalyst layer uses a catalyst using a carbon support having pores almost categorized as mesopores, and the catalyst layer cannot sufficiently increase its catalytic activity.

On the other hand, the ionomer in the present embodiment has a glass transition temperature equal to or greater than 160° C., and such ionomer is more rigid and less flexible than ionomers having a glass transition temperature lower than 160° C. Thus, by combining an ionomer according to the present embodiment with a catalyst using a carbon support according to the present embodiment, the resulting catalyst layer can effectively suppress contact between the ionomer and the catalyst metal as compared to a catalyst layer using a conventional ionomer, and can consequently reduce the amount of ionomer adhering onto the surface of the catalyst metal. As described above, the catalyst layer of the present embodiment can also suppress poisoning of the catalyst metal due to the adhesion of the ionomer, and can sufficiently increase the catalytic activity of the catalyst layer.

The catalyst layer of the present embodiment can be used either for a catalyst layer used on the cathode side of a fuel cell (cathode-side catalyst layer) or for a catalyst layer used on the anode side of a fuel cell (anode-side catalyst layer), depending on the intended use.

Catalyst

The catalyst in the present embodiment includes a carbon support having pores with a pore diameter of from 1 nm to 5 nm and a catalyst metal supported within the pores of the carbon support.

The term "a carbon support having pores with a pore diameter of from 1 nm to 5 nm" means a carbon support having pores with a pore diameter of from 1 nm to 5 nm, wherein the pore volume of the pores with a pore diameter of from 1 nm to 5 nm is equal to or greater than 11.0 mL/g.

The above "pore diameter" of the pores of the carbon support means the diameter of the pores which is determined by measuring the carbon support according to a gas (nitrogen) adsorption method.

The above "pore volume of the pores with a pore diameter of from 1 nm to 5 nm" means the total volume of pores present in the structure of the carbon support and having a pore diameter of from 1 nm to 5 nm. Such pore volume can be measured, for example, by using a gas adsorption measurement apparatus. In the below description, when a pore volume of pores having a given pore diameter is referred to, that will similarly mean the total volume of pores having the given pore diameter.

The catalyst according to the present embodiment has a catalyst metal which is supported within the pores having a pore diameter of from 1 nm to 5 nm, but the catalyst metal may further be supported on the surface of the carbon support (i.e., outside the pores). From the viewpoint of preventing contact between the ionomer and the catalyst metal in the catalyst layer, the catalyst metal supported within the pores is preferably equal to or greater than 50% by mass, more preferably equal to or greater than 80% by mass, and particularly preferably equal to or greater than 95% by mass based on the entirety of the catalyst metal included in the catalyst layer.

In the catalyst according to the present embodiment, if the pore volume of the pores having a pore diameter of from 1 nm to 5 nm in the carbon support is less than 11.0 mL/g, the amount of catalyst metal that can be supported within the pores having a pore diameter of from 1 nm to 5 nm in the carbon support decreases. From the viewpoint of further increasing the amount of catalyst that can be supported within the pores having a pore diameter of from 1 nm to 5 nm in the carbon support, the above-mentioned pore volume is preferably equal to or greater than 13.0 mL/g, and more preferably equal to or greater than 15.0 mL/g. Although the upper limit of the pore volume is not particularly limited, the pore volume is preferably equal to or less than 30 mL/g, more preferably equal to or less than 20 mL/g, and particularly preferably equal to or less than 25 mL/g from the viewpoint that the utilization rate of catalyst particles will decrease when the distance from the ionomer is too large.

The carbon support used for the catalyst according to the present embodiment may have pores with a pore diameter not within the range of from 1 nm to 5 nm; for example, it may have pores with a pore diameter greater than 5 nm and 10 nm or less. When the carbon support used for the catalyst according to the present embodiment has pores with a pore diameter greater than 5 nm and 10 nm or less, the pore volume of such pores with a pore diameter greater than 5 nm and 10 nm or less is preferably from 1 mL/g to 10 mL/g, more preferably from 2 mL/g to 5 mL/g, and particularly preferably from 2 mL/g to 3 mL/g, from the viewpoint of ensuring diffusion of the reactant gas.

In the catalyst according to the present embodiment, the mode diameter of the pores of the carbon support is not particularly limited, as long as the above-described conditions are met. If the diameters of the pores are too large, the ionomer can enter the pores more easily and the likelihood of the ionomer coming into direct contact with the catalyst metal may increase. On the other hand, if the diameters of the pores are too small, the distance between the catalyst metal and the ionomer will be too large and this may decrease the catalytic activity due to a decrease of the catalyst utilization rate. From the viewpoint of balancing the pore sizes of the carbon support and the pore volume, etc., of the carbon support in the present embodiment, the mode diameter of the pores of the carbon support in the present embodiment is preferably from 1 nm to 20 nm, more preferably from 1 nm to 10 nm, and particularly preferably from 1 nm to 5 nm.

The shape of the catalyst (the shape of the carbon support) in the present embodiment is not particularly limited, as long as the effect of the present invention is not impaired. For example, the catalyst may have a granulated, porous structure. As the diameter of the particles of the carbon support decreases, the aggregation between the carbon support particles increases. In view of the balance between such aggregation between the carbon support particles and the adsorption of the ionomer of the present embodiment to carbon, the carbon support preferably has a particle diameter equal to or greater than 30 nm, more preferably equal to or greater than 50 nm, and particularly preferably equal to or greater than 100 nm. Meanwhile, although the upper limit of the particle diameter of the carbon support is not particularly limited, the particle diameter is preferably equal to or less than 200 nm, more preferably equal to or less than 150 nm, and particularly preferably equal to or less than 120 nm, from the viewpoint of ensuring voids in the catalyst layer and thereby ensuring diffusion of gas in the catalyst layer. The particle diameter of the carbon support can be determined, for example, by assuming one particle in a TEM (Transmission Electron Microscope) image as a sphere, so as to calculate its diameter, conducting such calculation of the particle diameter based on TEM observation for 200 to 300 particles of the same type to obtain their average, and taking the obtained average particle diameter as the particle diameter of the carbon support. It should be noted here that the catalyst in the present embodiment may have a support with a shape other than a granulated, porous structure, as long as the catalyst has the above-described distribution of pores therein.

The BET specific surface area of the catalyst (carbon support) in the present embodiment (more specifically, the BET specific surface area of the catalyst metal per 1 g of the support ($m^2$/g of support)) is preferably equal to or greater than 715 $m^2$/g of support, more preferably equal to or greater than 750 $m^2$/g of support, and particularly preferably equal to or greater than 1,000 $m^2$/g of support, from the viewpoint of further increasing the amount of catalyst metal that can be supported within the pores with a pore diameter of from 1 nm to 5 nm in the carbon support. Although the upper limit of the BET specific surface area in the catalyst of the present embodiment is not particularly limited, the BET specific surface area is preferably equal to or less than 2,000 $m^2$/g of support, more preferably equal to or less than 1,500 $m^2$/g of support, and particularly preferably equal to or less than 1,200 $m^2$/g of support, from the viewpoint that the utilization rate of the catalyst particles decreases with an increase in the amount of pores. The BET specific surface area of the catalyst in the present embodiment can be measured according to a gas adsorption method using a known measurement device.

In the carbon support used for the catalyst of the present embodiment, a half-band width in the Raman G-band (a peak intensity at around 1,580 $cm^{-1}$ determined by Raman scattering spectroscopy) is preferably equal to or less than 100 $cm^{-1}$, more preferably equal to or less than 85 $cm^{-1}$, and particularly preferably equal to or less than 60 $cm^{-1}$, from the viewpoint that degradation (corrosion) of the carbon support cannot be sufficiently prevented if the carbon support is not sufficiently graphitized. Although the lower limit of the above half-band width in the Raman G-band is not particularly limited, the half-band width is preferably equal to or greater than 40 $cm^{-1}$, from the viewpoint that it is difficult for the carbon support to support a catalyst metal (e.g., catalyst particles of Pt or Pt alloy) if the carbon support is excessively crystallized. Herein, the "half-band width in the Raman G-band" means a half-band width in the G-band which is calculated from a Raman spectrum measured by Raman scattering spectroscopy. The "half-band width" is a value used for determining a distribution in a particular absorption band, and indicates a width of the absorption band at half of the peak height of the absorption band. The above-mentioned Raman spectrum of the carbon support is preferably measured after the carbon support has supported a catalyst therein.

The catalyst in the present embodiment may include an acidic group. Such acidic group binds onto the surface of the carbon support. When the catalyst in the present embodiment includes an acidic group, transportation of protons in the catalyst layer may be facilitated or durability of the catalyst may be increased. The acidic group is not particularly limited, as long as it is a functional group capable of being ionized to release protons, and examples thereof include a carboxyl group, a hydroxyl group and a lactone group, in which a carboxyl group is preferably used. The method for adding an acidic group to the catalyst in the present embodiment is not particularly limited, and one example that can be used is a wet method in which a carbon support supporting a catalyst metal therein is immersed in an acidic solution including an oxidant.

From the viewpoint of ensuring the hydrophilic property of the catalyst metal and facilitating the transportation of protons, the amount of acidic group bonded to the catalyst in the present embodiment is preferably equal to or greater than 0.7 mmol/g of support, more preferably equal to or greater than 0.75 mmol/g of support, still more preferably equal to or greater than 1.2 mmol/g of support, and particularly preferably equal to or greater than 1.8 mmol/g of support. Although the upper limit of the amount of acidic group bonded to the catalyst in the present embodiment is not particularly limited, the amount is preferably equal to or less than 3.0 mmol/g of support, and more preferably equal to or less than 2.5 mmol/g of support, from the viewpoint of durability of the carbon support. The amount of the acidic group can be measured by titration using an alkali compound.

The carbon support in the present embodiment refers to a material containing carbon as its major component. Such carbon support may include impurities other than carbon atoms, as long as the effect of the present invention is not impaired. The content of impurities other than carbon atoms included in the carbon support is preferably equal to or less than 5% by mass, more preferably equal to or less than 3% by mass, and particularly preferably equal to or less than 1% by mass. For example, carbon particles of carbon black, activated carbon, or the like, may be used for the carbon support, and so-called mesoporous carbon, etc., may also be used.

For the catalyst metal used for the catalyst in the present embodiment, any known catalyst metal can be selected and used as appropriate, depending on the purpose of use, as long as the metal has the effect of catalyzing electrochemical reaction in the fuel cell. Examples of such catalyst metal include platinum, rhodium, palladium, iridium, osmium, ruthenium, rhenium, gold, silver, nickel, cobalt, lithium, lanthanum, strontium and yttrium, and one or two or more of these metals can be selected and used. An alloy prepared by combining two or more of the above metals may also be used as the catalyst metal. Among these catalyst metals, a suitable catalyst metal or metals may be selected as appropriate, depending on the purpose of use of the catalyst layer in the present embodiment. For example, when the catalyst layer in the present embodiment is used as a cathode-side catalyst layer, a catalyst metal having the effect of catalyzing the reduction reaction of oxygen can be used suitably. When the catalyst layer in the present embodiment is used as an anode-side catalyst layer, a catalyst metal having the effect of catalyzing the oxidation reaction of hydrogen can be appropriately selected. As the catalyst metal used for the catalyst in the present embodiment, for example, platinum and platinum-containing alloys can be suitably used.

The shape of the catalyst metal is not particularly limited, and the catalyst metal may be, for example, in a layered form or in the form of scales. Further, the size of the catalyst metal is not particularly limited, but it is preferable to select an appropriate size according to the size of the pores of the carbon support from the viewpoint of allowing the catalyst metal to be supported within the pores. For example, the catalyst metal preferably has an average particle diameter of from 2 nm to 5 nm, more preferably from 3 nm to 5 nm, and particularly preferably from 3 nm to 4 nm, in view of an improvement in performance due to an increase of the specific surface area and a reduction in durability due to elution. The average particle diameter of the catalyst metal can be determined based on the half-band width in a peak of an XRD (X-Ray Diffraction) spectrum.

The catalyst-supporting ratio of the catalyst in the present embodiment is preferably from 10 to 80% by mass, more preferably from 20 to 70% by mass and particularly preferably from 30 to 50% by mass, based on the total amount of the carbon support and the catalyst metal, from the viewpoint of ensuring gas diffusion by a certain thickness of the catalyst layer, and further considering an allowable water content at the time of startup under freezing temperature and efficiency in causing the catalyst particles to be supported in the support.

The catalyst content per unit area ($mg/cm^2$) in the catalyst of the present embodiment is preferably from 0.01 to 1.0 $mg/cm^2$, more preferably from 0.05 to 0.4 $mg/cm^2$, and particularly preferably from 0.1 to 0.3 $mg/cm^2$, in view of the performance attained by ensuring a particular surface area, the costs arising from the use of noble metals, and the reserves of such noble metals.

Ionomer

In the catalyst layer of the present embodiment, a catalyst (a carbon support having a catalyst metal supported therein) is covered by an ionomer according to the present embodiment. Such ionomer according to the present embodiment can appropriately suppress its entry into the pores of the carbon support, particularly due to its glass transition temperature being equal to or greater than 160° C., so that a non-contact state between the ionomer and the catalyst metal supported within the pores can be maintained. As a result, interfaces between three phases, i.e., the catalyst metal, oxygen gas and water, can be maintained within the pores of the catalyst in the present embodiment, thereby ensuring the area of the catalyst metal having reaction activity.

When an ionomer is adsorbed into a carbon support, the acidity of the portion around the adsorbed area increases and the oxidation reaction of the carbon support ($C+2H_2O \rightarrow CO_2+4H^++4e^-$) is accelerated so that the degradation of the carbon support is likely to be accelerated. On the other hand, an ionomer having a glass transition temperature equal to or greater than 160° C. has lower adsorbability to the carbon support than that of usual ionomers, so that the effect of the catalyst layer can be maintained for longer.

The ionomer according to the present embodiment is an ion-conducting polymer compound. The ionomer according to the present embodiment preferably has a proton-conducting group, such as a sulfonic group, and such ionomer can function, for example, to transfer protons generated around the catalyst active material present on the anode (on the fuel electrode).

The glass transition temperature of the ionomer according to the present embodiment is equal to or greater than 160° C. When the ionomer has a glass transition temperature lower than 160° C., the ionomer will easily enter the pores with a pore diameter of 1 nm to 5 nm in the carbon support of the present embodiment, so that the likelihood of the ionomer coming into contact with the catalyst metal within the catalyst layer will increase. Although the upper limit of the glass transition temperature is not particularly limited, the glass transition temperature is preferably equal to or lower than 200° C., more preferably equal to or lower than 180° C., and particularly preferably equal to or lower than 170° C., from the viewpoint of the strength properties of the catalyst layer being degraded due to an increase in rigidity.

The weight average molecular weight of the ionomer according to the present embodiment is not particularly limited and is preferably from 5,000 to 200,000, more preferably from 10,000 to 150,000, and particularly preferably from 20,000 to 100,000, from the viewpoint of ensuring chemical stability and the strength of the catalyst layer.

It is preferable for the catalyst layer to have a lower oxygen gas diffusion resistance. For this reason, the ionomer according to the present embodiment preferably has an oxygen permeability equal to or greater than a specific value under usual operation conditions of polymer electrolyte fuel cells. From such viewpoint, the oxygen permeability in an environment under a temperature of 80° C. and a relative humidity of 30% is preferably equal to or greater than $2.0 \times 10^{-14}$ mol/m/sec/Pa, more preferably equal to or greater than $2.5 \times 10^{-14}$ mol/m/sec/Pa, and particularly preferably equal to or greater than $3.0 \times 10^{-14}$ mol/m/sec/Pa. Oxygen permeability can be measured by, for example, casting an electrolyte resin into a thin film having a thickness of about 0.2 mm and using linear sweep voltammetry (LSV) with a Pt microelectrode. Although the upper limit of the above-described oxygen permeability is not particularly limited, the oxygen permeability is preferably equal to or less than $5.0 \times 10^{-14}$ mol/m/sec/Pa, more preferably equal to or less than $4.0 \times 10^{-14}$ mol/m/sec/Pa, and particularly preferably equal to or less than $3.0 \times 10^{-14}$ mol/m/sec/Pa, since excessively high gas permeability accelerates the drying of the catalyst layer.

The EW (equivalent weight, unit: g/eq) of the ionomer according to the present embodiment, which indicates an equivalent weight of the proton-conducting group (e.g., a sulfonic group) in the ionomer, is preferably equal to or less than 1,500 g/eq, more preferably equal to or less than 1,200 g/eq, and particularly preferably equal to or less than 1,000 g/eq, from the viewpoint of the ion conductivity in the entire catalyst layer. Herein, the equivalent weight of the proton-conducting group means a dry weight of the proton-conducting group relative to the total mass of the ionomer. Furthermore, as for the lower limit of the above EW in the ionomer according to the present embodiment, the EW is preferably equal to or greater than 500 g/eq, more preferably equal to or greater than 600 g/eq, and particularly preferably equal to or greater than 700 g/eq, when taking into account the movement of water in light of the hydrophilic properties of the catalyst layer as a whole. The dry weight of the proton-conducting group can be determined by a known method, such as back titration using an aqueous NaOH solution.

One example of the ionomer according to the present embodiment is an ionomer having a unit structure represented by the following formula (1):

[Chemical 1]

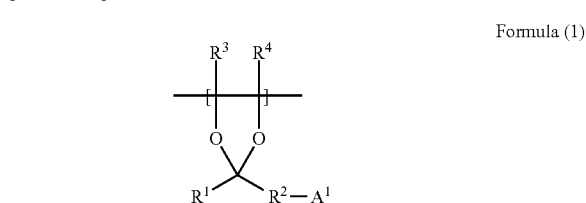

Formula (1)

wherein $R^1$ to $R^4$ each independently represent F or a perfluoroalkyl group having 1 to 10 carbon atoms; $A^1$ is absent or represents F, $SO_3H$, or $SO_2$—NH—$SO_2$-$A^2$; $A^2$ represents a perfluoroalkyl group having 1 to 10 carbon atoms, $(CF_2)_a$—$SO_2$—NH—$SO_2R^5$, or $(CF_2)_b$—$SO_3H$; $R^5$ represents a perfluoroalkyl group having 1 to 10 carbon atoms; a is an integer of 1 to 10; and b is an integer of 1 to 10.

When the ionomer according to the present embodiment, which has the unit structure of formula (1) above, does not include any acidic groups in formula (1), e.g., when $A^1$ is absent in formula (1), the ionomer has another structural unit including an acidic group or other proton-conducting groups. Suitable examples of the unit structure of formula (1) above include unit structures represented by formula (2) below,

[Chemical 2]

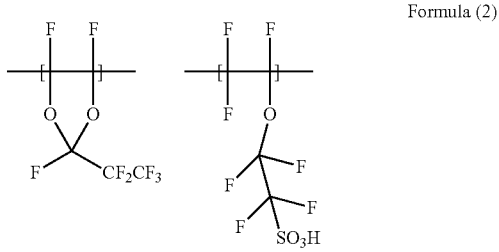

Formula (2)

Commercially available products may be selected and used as appropriate for the ionomer according to the present embodiment, as long as such products satisfy the desired performance.

Now, the method for forming a membrane electrode assembly using a catalyst layer according to the present embodiment will be described. The method for forming a membrane electrode assembly is not particularly limited, and known methods may be used as appropriate. For example, a membrane electrode assembly can be formed by preparing a catalyst ink which includes a catalyst according to the present embodiment and an ionomer according to the present embodiment, conducting dispersion treatment for the obtained catalyst ink, applying the resulting catalyst ink to an electrolyte membrane, and then drying the ink, thereby forming a catalyst layer according to the present embodiment on the electrolyte membrane.

The catalyst ink may include, in addition to the catalyst and the ionomer, at least a dispersion medium. The dispersion medium in the catalyst ink is not particularly limited and may be selected as appropriate according to the ionomer used. Examples of the dispersion medium include alcohols, such as methanol, ethanol, propanol and propylene glycol, N,N-dimethylformamide, N,N-diethylformamide, N,N-dimethylacetamide, and N,N-diethylacetamide, as well as mixtures thereof and mixtures with water.

The method for dispersion of the catalyst ink is not particularly limited and, for example, a homogenizer, a bead mill, a shear mixer, a roll mill, and the like may be used.

The catalyst ink may be applied and dried by selecting a known application method and a known drying method as appropriate. For example, a spray method, a screen printing method, a doctor blade method, a gravure printing method, and a die coating method may be used as the application method. Examples of the drying method include drying under reduced pressure, drying by heating, and drying by heating under reduced pressure. The specific conditions for such drying under reduced pressure or drying by heating are not particularly limited and may be determined as appropriate.

The electrolyte membrane may be a fluorine-based polymer electrolyte membrane containing a fluorine-based polymer electrolyte, such as a perfluorosulfonic acid polymer electrolyte membrane, e.g., Nafion (registered trademark, made by Du Pont Kabushiki Kaisha), and other examples include hydrocarbon-based polymer electrolyte membranes containing a hydrocarbon-based polymer electrolyte obtained by introducing a protonic acid group (proton-conducting group), such as a sulfonic group, a carboxylic group, a phosphoric group or a boronic group, into a hydrocarbon-based polymer, such as an engineering plastic, e.g., polyether ether ketone, polyether ketone, polyethersulfone, polyphenylene sulfide, polyphenylene ether, and polyparaphenylene, or a common plastic, e.g., polyethylene, polypropylene, and polystyrene. Although the thickness of the electrolyte membrane is not particularly limited, it is preferably about 5 to 30 μm.

In the above-described membrane electrode assembly, a pair of gas diffusion layers may further be provided, as required, on the outer side of the paired catalyst layers (opposite from the side where the catalyst layers are in contact with the electrolyte membrane), so as to sandwich the paired catalyst layers. Such gas diffusion layers may be provided between the electrolyte membrane and the catalyst layers. A gas diffusion layer sheet for forming such gas diffusion layers may be made of materials having: a gas diffusion property enabling efficient supply of fuel to the oxidant electrode catalyst layer; electrical conductivity; and necessary strength as a material that constitutes a gas diffusion layer, and examples of such materials include carbonaceous porous materials, such as carbon paper, carbon cloth, and carbon felt, and electrically conductive porous materials, such as metal mesh or porous metal material composed of metal, e.g., titanium, aluminum, copper, nickel, nickel-chromium alloys, copper and its alloys, silver, aluminum alloys, zinc alloys, lead alloys, titanium, niobium, tantalum, iron, stainless steel, gold, and platinum. The thickness of the electrically conductive porous material is preferably about 50 to 500 μm.

Fuel Cell

A fuel cell according to the present embodiment comprises a catalyst layer according to the present embodiment. The catalyst layer of the present embodiment has excellent catalytic activity and, thus, a fuel cell using this catalyst layer can exhibit excellent power generation performance. The type of fuel cell of the present embodiment is not particularly limited, as long as a catalyst layer including a catalyst and an ionomer can be used for the fuel cell. The fuel cell may be, for example, a polymer electrolyte fuel cell (PEFC) or a phosphoric acid fuel cell (PAFC).

The configuration of a fuel cell comprising a catalyst layer according to the present embodiment will be described below by taking a polymer electrolyte fuel cell as an example. The fuel cell of the present embodiment has, as its basic structure, a membrane electrode assembly comprised of an electrolyte membrane and catalyst layers that sandwich the electrolyte membrane. In the membrane electrode assembly, a pair of gas diffusion layers are further provided on the outer side of the paired catalyst layers (i.e., opposite from the side where the catalyst layers are in contact with the electrolyte membrane), so as to sandwich the paired catalyst layers. In the membrane electrode assembly, a layered portion of the catalyst layer and the gas diffusion layer on one side of the electrolyte membrane forms a cathode electrode. Similarly, a layered portion of the catalyst layer and the gas diffusion layer on the other side of the electrolyte membrane forms an anode electrode. In the fuel cell of the present embodiment, a pair of separators are provided so as to sandwich the outer side of the respective electrodes of the membrane electrode assembly, thereby forming a unit cell. A gas flow path is formed at a boundary between each separator and the electrode. The fuel cell of the present embodiment may have a structure in which a plurality of unit cells is stacked and electrically connected to each other.

The catalyst layer of the present embodiment may be used for either a catalyst layer used for the cathode of the fuel cell (cathode-side catalyst layer) or a catalyst layer used for the anode of the fuel cell (anode-side catalyst layer). In light of the impact on the performance of the fuel cell, it is preferable for the catalyst layer of the present embodiment to be used at least for the cathode-side catalyst layer. The catalyst layer of the present embodiment may be used for both the cathode-side catalyst layer and the anode-side catalyst layer.

It should be noted that the embodiment described above is just one example and the present invention is not limited to the described embodiment.

EXAMPLES

The present invention will now be more specifically described by way of the Examples set forth below.

(Production of Fuel Cell Membrane Electrode Assembly)

1 g of catalyst powder shown in Table 1 below and 15 g of water were placed in a container and mixed by stirring them with centrifugal force so that the carbon-supported catalyst was well blended with water. After that, 8 g of ethanol was added to the mixture and the mixture was similarly stirred with centrifugal force so as to homogenize the mixture as a whole. Further, 2 g of ionomer shown in Table 1 was added to the resulting mixture and the mixture was similarly homogenized by stirring with centrifugal force, to accordingly obtain a catalyst ink raw material.

20 mL of catalyst ink raw material and 60 g of PTFE (polytetrafluoroethylene) balls ($\varphi$=2.4 mm) for fracture were put in a PTFE pot in a dry atmosphere, and the pot was then sealed hermetically. After that, the container was attached to a planetary ball mill, so as to conduct mechanical milling under the conditions of: a disk rotational speed of 600 rpm; a temperature of 20° C.; and a treating time of one hour. After the completion of the mechanical milling, the mixture in the container was filtered with mesh, so as to remove the balls and collect the catalyst ink.

The obtained catalyst ink was then charged into a spray gun (Spectrum S-920N, made by Nordson Corporation) and the ink was applied to one surface (on the cathode side) of an electrolyte membrane (NR211, made by Du Pont) so that the amount of catalyst was 300 to 500 µg/cm². Furthermore, an ink was prepared by using commercially available platinum-supporting carbon (made by Tanaka Kikinzoku Kogyo K.K.) and applied to the other surface (on the anode side) of the electrolyte membrane similarly to the cathode side, except that the amount of platinum per area of the electrode was 0.1 mg. In this manner, a membrane electrode assembly having an electrode area of 1 cm² was obtained.

[Evaluation of Catalytic Activity]

By using the membrane electrode assembly with an electrode area of 1 cm², measurement was performed at a cell temperature of 60° C., under a sufficiently moisturized condition having 80% humidity with an anode (hydrogen) dew point of 55° C. and a cathode (air) dew point of 55° C., in the following manner. Firstly, the membrane electrode assembly was left for several hours at a voltage equal to or lower than 0.2 V, which is a voltage at which the surface of the catalyst is tentatively placed at a reduction condition. After that, the voltage was increased to 0.9 V in increments of 0.1 V, while holding the voltage at each point for three minutes. The current density (A/cm²) was read when the voltage was at 0.88 V and the obtained value was divided by the amount of platinum present on the electrode surface of the cathode, so as to thereby calculate a mass activity (MA) [A/g-Pt] @ 0.88 V in the MEA. The mass activity of the MEA in Comparative Example 1 was regarded as 1.00, and the mass activity of each of the Example and the Comparative Examples was shown as a ratio relative to Comparative Example 1.

TABLE 1

| Catalyst layer constitution | | Example 1<br>Catalyst A<br>Ionomer A | Comparative<br>Example 1<br>Catalyst B<br>Ionomer B | Comparative<br>Example 2<br>Catalyst B<br>Ionomer A | Comparative<br>Example 3<br>Catalyst A<br>Ionomer B |
|---|---|---|---|---|---|
| Physical properties of catalyst | Pore volume (pore diameter: 1 nm or more and 5 nm or less) | 16.1 mL/g | 10.1 mL/g | 10.1 mL/g | 16.1 mL/g |
| | Pore volume (pore diameter: more than 5 nm arid 10 nm or less) | 7.2 mL/g | 16.3 mL/g | 16.3 mL/g | 7.2 mL/g |
| | Mode diameter of pores | 2.0 nm | 6.0 nm | 6.0 nm | 2.0 nm |
| | Average particle diameter of carbon support | 100 nm | 18 nm | 18 nm | 100 nm |
| | Average particle diameter of catalyst metal (Pt) | 3.0 nm | 3.8 nm | 3.8 nm | 3.0 nm |
| | BET specific surface area | 1,000 m²/g | 800 m²/g | 800 m²/g | 1000 m²/g |
| | Amount of acidic group | 0.6 mmol/g | 0.6 mmol/g | 0.6 mmol/g | 0.6 mmol/g |
| | Half-band width in Raman G-band | 43.2 cm⁻¹ | 65.6 cm⁻¹ | 65.6 cm⁻¹ | 43.2 cm⁻¹ |

TABLE 1-continued

| Catalyst layer constitution | | Example 1 Catalyst A Ionomer A | Comparative Example 1 Catalyst B Ionomer B | Comparative Example 2 Catalyst B Ionomer A | Comparative Example 3 Catalyst A Ionomer B |
|---|---|---|---|---|---|
| Physical properties of ionomer | EW | 830 g/eq | 925 g/eq | 830 g/eq | 925 g/eq |
| | Glass transition temperature | 160° C. | 110° C. | 160° C. | 110° C. |
| | Oxygen permeability (LSV method: 80° C., relative humidity 30%) | $2.1 \times 10^{-14}$ mol/m/s/Pa | $5.8 \times 10^{-15}$ mol/m/s/Pa | $2.1 \times 10^{-14}$ mol/m/s/Pa | $5.8 \times 10^{-15}$ mol/m/s/Pa |
| Catalytic activity ratio | | 1.90 | 1.00 | 1.34 | 1.33 |

For catalysts A and B and ionomers A and B indicated in Table 1 above, the following materials were used:

Catalyst A: Pt—Co-supporting, porous, highly crystalline carbon (carbon support having pores with a pore diameter of 1 nm to 5 nm (with a pore volume of pores having a pore diameter of from 1 nm to 5 nm equal to or greater than 11.0 mL/g));

Catalyst B: Pt—Co/acetylene black;

Ionomer A: Ionomer with high Tg and high oxygen permeability (glass transition temperature: 160° C.); and Ionomer B: Nafion (registered trademark).

As shown in Table 1, the membrane electrode assembly of Example 1 exhibited significantly favorable catalytic activity relative to the membrane electrode assemblies of Comparative Examples 1 to 3. The membrane electrode assembly of Comparative Example 2 (which employed a catalyst layer including catalyst B, which is outside the scope of the present embodiment, and ionomer A, which corresponds to the ionomer of the present embodiment) and the membrane electrode assembly of Comparative Example 3 (which employed a catalyst layer including catalyst A, which corresponds to the catalyst of the present embodiment, and ionomer B, which is outside the scope of the present embodiment) were observed as having high catalytic activity relative to the membrane electrode assembly of Comparative Example 1 (which employed a catalyst layer including catalyst B and ionomer B, both of which are outside the scope of the present embodiment). It was observed, however, that the membrane electrode assembly of Example 1 had an unexpectedly excellent effect as compared to the results of Comparative Examples 2 and 3.

What is claimed is:

1. A fuel cell catalyst layer comprising:
a catalyst comprising
a carbon support comprising pores with a pore diameter of from 1 nm to 5 nm, and
a catalyst metal supported at least within the pores of the carbon support having the pore diameter of from 1 nm to 5 nm; and
an ionomer having a glass transition temperature equal to or greater than 160° C.,
wherein a pore volume of the pores with the pore diameter of from 1 nm to 5 nm is equal to or greater than 15.0 mL/g,
wherein the carbon support further comprises pores with a pore diameter greater than 5 nm and 10 nm or less, and
wherein a pore volume of the pores with the pore diameter greater than 5 nm and 10 nm or less is from 1 mL/g to 10 mL/g.

2. The fuel cell catalyst layer according to claim 1, wherein the ionomer has an oxygen permeability equal to or greater than 2.0×10-14 mol/m/sec/Pa in an environment at a temperature of 800 C and a relative humidity of 30%.

3. A fuel cell comprising the fuel cell catalyst layer according to claim 1.

* * * * *